United States Patent

[11] 3,540,539

| [72] | Inventor | Erwin M. Lau |
| | | Dolton, Illinois |
| [21] | Appl. No. | 799,356 |
| [22] | Filed | Feb. 14, 1969 |
| [45] | Patented | Nov. 17, 1970 |
| [73] | Assignee | Black Products Co. |
| | | Chicago, Illinois |
| | | a corporation of Illinois |

[54] BAG FILLING MACHINE HAVING IMPROVED SCALE MECHANISM
10 Claims, 15 Drawing Figs.

[52] U.S. Cl. .................................................. 177/256,
[51] Int. Cl. ........................................................ G01g 21/08
[50] Field of Search ............................................ 177/160, 256, 257, 258, Bearings Digest, 246

[56] References Cited
UNITED STATES PATENTS
| 1,302,884 | 5/1919 | Varney | 177/Scale Bearings |
| 2,167,075 | 7/1939 | Hobson et al. | 177/258 |
| 2,861,846 | 11/1958 | Webster | 177/Scale Bearings |
| 3,119,218 | 1/1964 | Rose et al. | 177/160X |

FOREIGN PATENTS
| 8,701 | 6/1915 | Great Britain | 177/257 |
| 616,345 | 1/1949 | Great Britain | 177/246 |

Primary Examiner—Richard B. Wilkinson
Assistant Examiner—George H. Miller, Jr.
Attorney—Zabel, Baker, York, Jones and Dithmar ABSTRACT: The scale mechanism includes links having arcuate knife edges and lathe-turned beams having annular V-notch saddles providing a self aligning connection between the two beams, and between the lower beam and a spout supporting frame which is confined to vertical movement by leaf springs. The links are removable from the beams and the frame, the beams from the fulcrums, and the fulcrums from the mounting plate. Stops limit the vertical movement of the frame when disconnected from the scale mechanism.

Patented Nov. 17, 1970

Inventor:
Erwin M. Lau
By: Zahl, Baker, York,
Jones & Dithmar
Attorneys

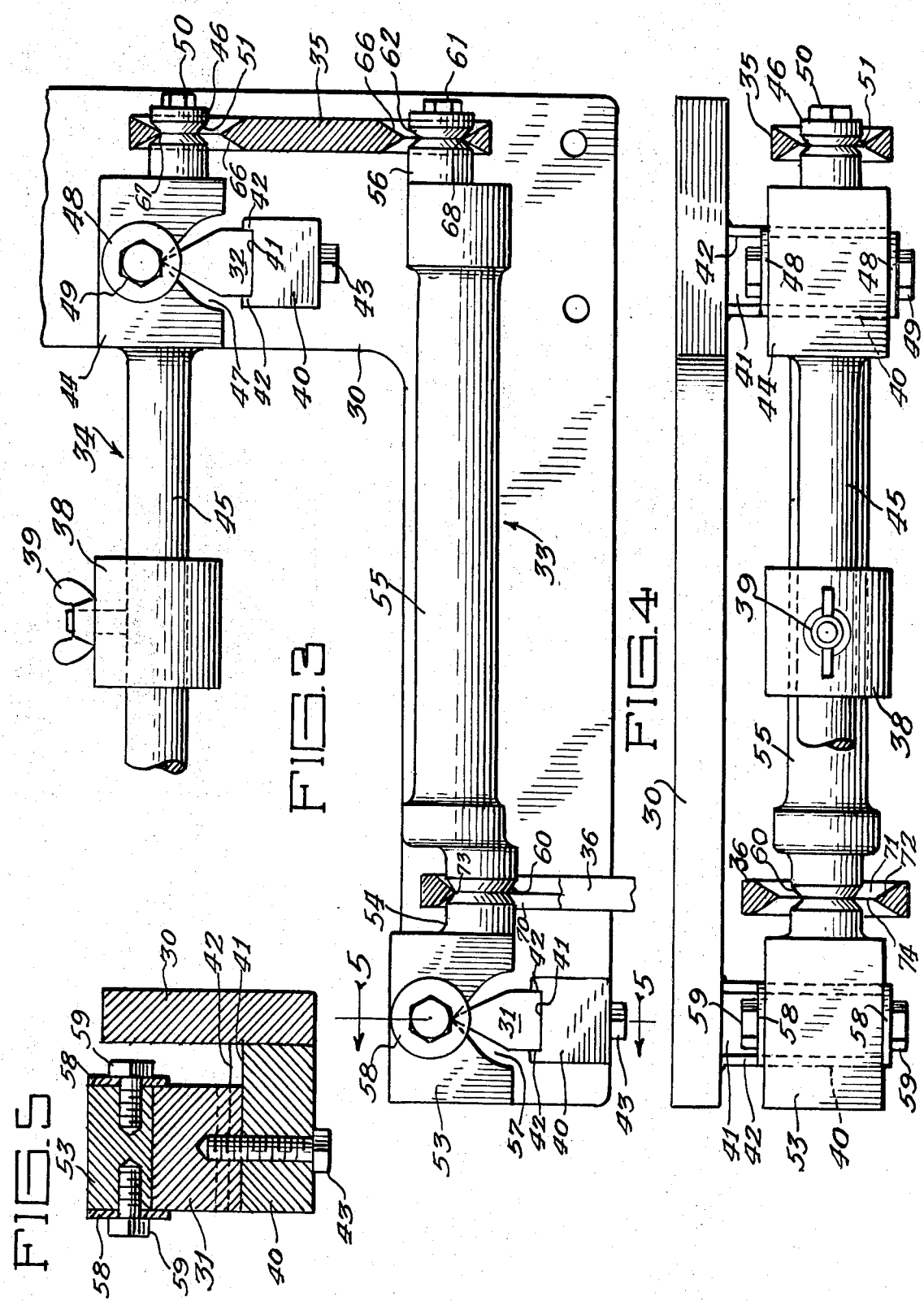

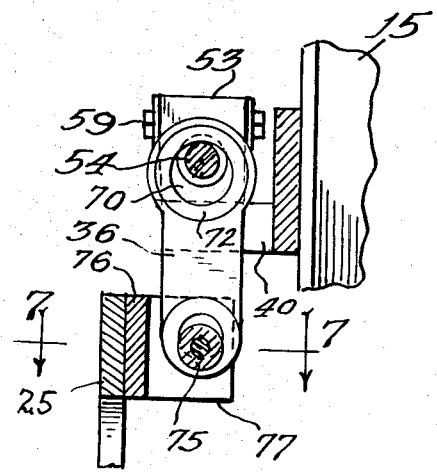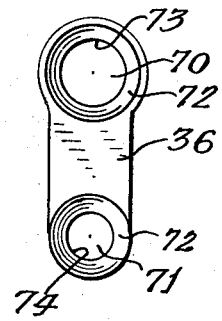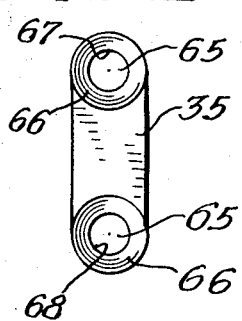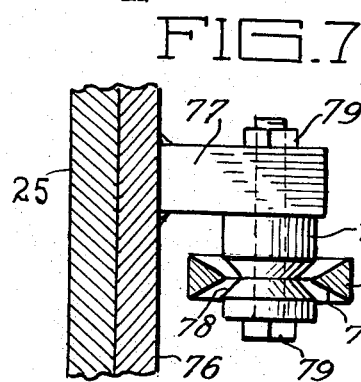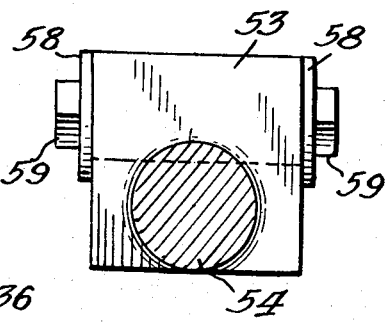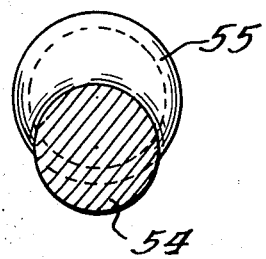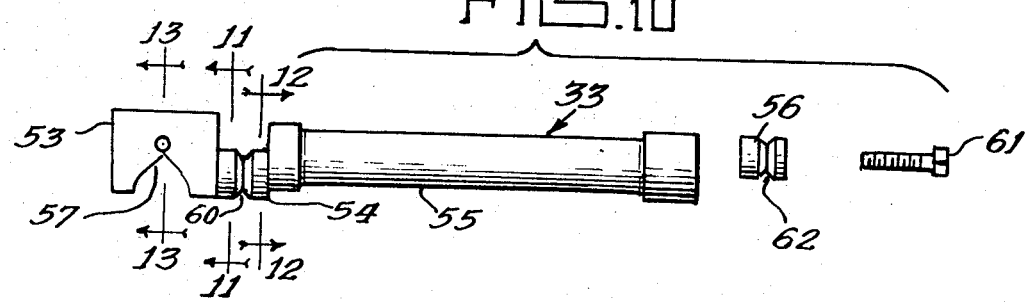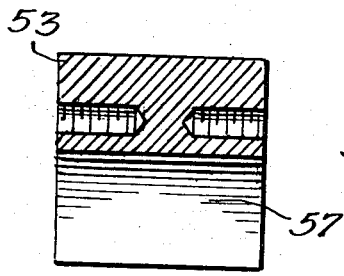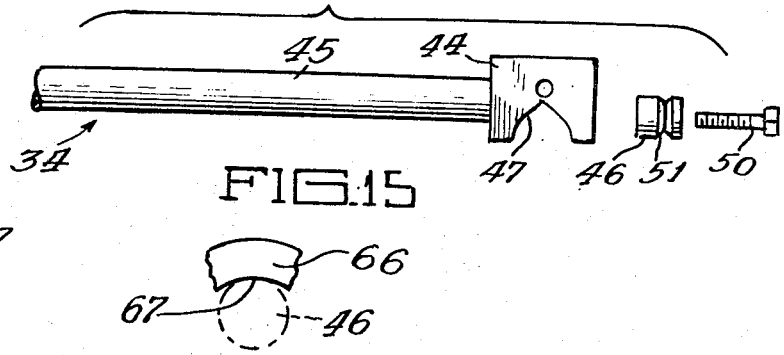

BAG FILLING MACHINE HAVING IMPROVED SCALE MECHANISM

SPECIFICATION

This invention relates to bag filling machines, and in particular to an improved scale mechanism therefor.

The present invention is an improvement in the bag filling machine of my earlier U.S. Pat. No. 3,366,190, granted Jan. 30, 1968, which patent relates to the combination of scale mechanism and a tension stabilized spout supporting frame.

The present invention provides a much simpler scale mechanism which is of equal or greater sensitivity.

One object of the present invention is to provide an improved scale mechanism which is demountable. In packing certain fertilizers, such as nitrates, sulfates, ureas and phosphates, it has been found that the scale mechanism has an extremely short life due to corrosion of the various fulcrum points and knife edges, and their saddles. This is apparently due to the fact that a layer of powder settles on the scale parts, and in a humid atmosphere there is a certain amount of hydrolysis resulting in corrosion. This occurs even though the scale parts are cadmium plated, and it also occurs on the surface portions of the beams and other parts.

It has been found that the life of the scale mechanism can be greatly prolonged if the scale mechanism is removed at the end of each working day and taken to a different room which is free from air suspended powders and from humidity, and is stored therein over night. Preferably, it is desirable to wipe all the parts free from settled powders or to wash them in water and then dry them, so that they will be clean during the storage period.

According to my invention, I provide a scale mechanism in which the beams and the links are easily removed from the fulcrums, and in which the fulcrum points are easily removed from the mounting plate.

In a scale of this type, removal of the scale mechanism is likely to damage the leaf springs of the tension stabilized frame; therefore I provide means for limiting the deflection of the leaf springs.

According to another aspect of my invention, I provide an improved knife edge and saddle combination which not only has self-aligning characteristics, but also permits substantial cost reduction in the manufacture of the scale beam and a cooperating link.

More specifically, the knife edge and saddle combination provides universal movement between the link and the beam so that sensitivity is not lost where the movement of the beam and the part coupled thereto by the link is not colinear. This occurs between the load support, or spout supporting frame, and the lower beam because exact alignment is very difficult to obtain. It may also occur between the upper and lower beam of a compound beam scale due to nonparallelism of the fulcrums or due to other misalignment. In the latter instance both ends of the link should have the sensitive universal connection, whereas in the former case the same degree of sensitivity is required only at the upper end of the link although some universal connection should be provided at the lower end also.

According to my invention, I provide for the link a knife edge which is arcuate in a concave sense and a saddle which is a V-notch and arcuate in a convex sense and of smaller radius. These elements provide the sensitive pivoting movement about the front to back, or knife edge axis and also provide a rotational movement about a side to side axis which accommodates angular displacement of the link without interfering with the sensitivity of the knife edge pivoting movement.

The utilization of this concept permits substantial simplification in the manufacture of both the link and of the beam. The arcuate knife edge of the link can be made merely by counter boring, with a conical bit, a previously drilled circular hole in the link. The arcuate V-notch may be made merely by cutting an annular notch in a cylindrical portion of the beam.

Furthermore, the arrangement permits the use of lathe-turned elements for the beam, thus greatly reducing the cost as compared, for example, with the fabricated beam of my prior patent.

Other objects, features and advantages will become apparent as the description proceeds.

In the drawings:

FIG. 3 is an enlarged front elevation of the scale mechanism, partially in section;

FIG. 4 is a plan view of FIG. 3;

FIG. 5 is a vertical section taken along line 5-5 of FIG. 3;

FIG. 6 is a vertical section taken along line 6-6 of FIG. 2;

FIG. 7 is a plan section taken along line 7-7 of FIG. 6;

FIG. 8 and 9 are elevations of the two links;

FIG. 10 is an exploded view of the lower beam;

FIGS. 11, 12 and 13 are vertical sections taken along lines 11-11, 12-12, and 13-13, respectively of FIG. 10, FIG. 11 also showing the retaining washers;

FIG. 14 is an exploded view of the upper beam; and

FIG. 15 is a diagrammatic view identifying the link point.

Figure 1:
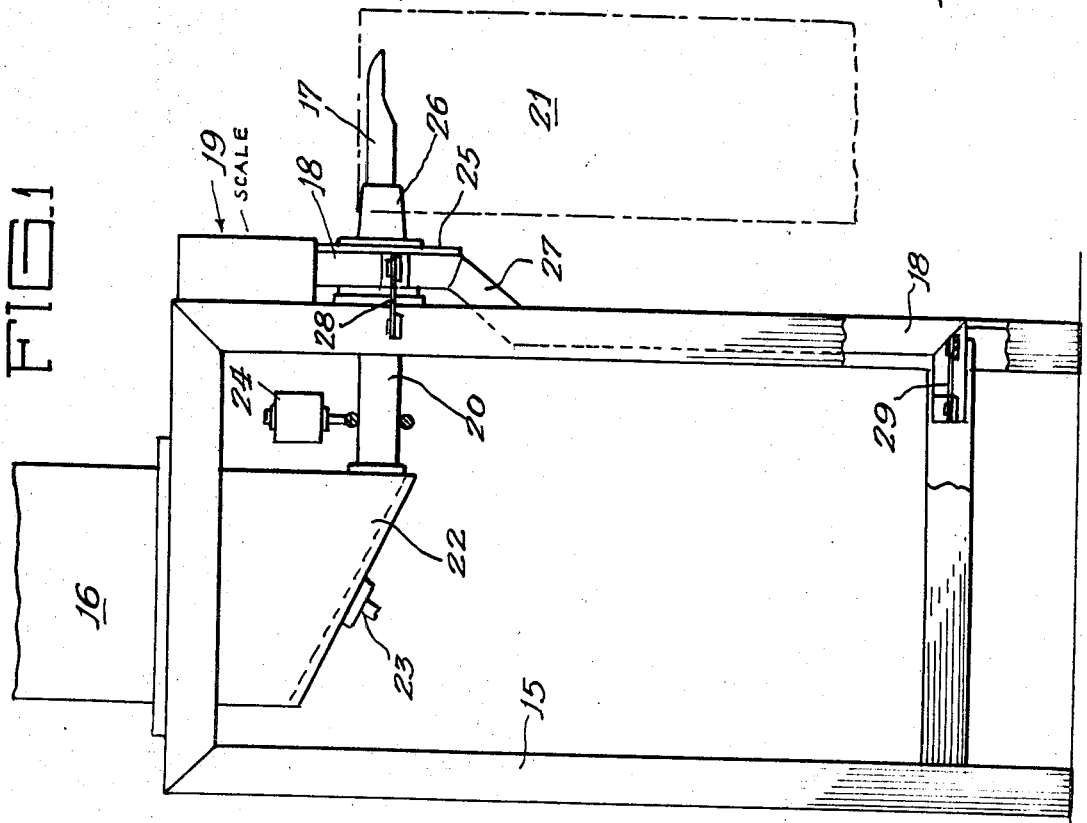
FIG. 1 is a side elevation of a bag filling machine embodying my invention.

With reference now to FIG. 1, the bag filling machine comprises the machine framework 15 and a chamber 16 adapted to receive the powdered or granular material to be fed into the bags. A bag supporting spout 17 communicates with the chamber 16 and is mounted at the upper end of a spout supporting frame 18. The spout supporting frame may also serve as a support for other equipment, not shown, such as a bag clamp and a bag saddle.

The spout supporting frame 18 is connected to a scale mechanism 19 (shown symbolically in FIG. 1, and in detail in the remaining FIGS.). Since the spout supporting frame 18 has relatively vertical movement with respect to the framework 15, a flexible connection is provided between the spout 17 and the chamber 16 in the form of a rubber tube 20.

Suitable feeding mechanism is provided for feeding the material from the chamber 16 into the bag 21. In the arrangement shown, the material is fluidized by a fluidizing pad 22 connected to an air supply pipe 23. Feed control means in the form of a inch valve 24 engages the rubber tube 20 to cut off the flow of fluidized material when the contents of the bag reach a predetermined weight, such as 100 pounds. However, other feeding arrangements may be used, such as an auger, or a gravity feed.

The spout supporting frame 18 includes a spout mounting plate 25, the spout 17 extending through the plate and being secured thereto by a suitable collar 26. The upper portion of the frame is offset forwardly at 27 so that it is disposed beneath the scale mechanism 19. The spout supporting frame 18 is confined to substantially vertical movement by upper and lower leaf springs 28 and 29 which extend between the frame 18 and the framework 15, providing a tension stabilized frame as described in detail in the aforementioned patent.

Figure 2:
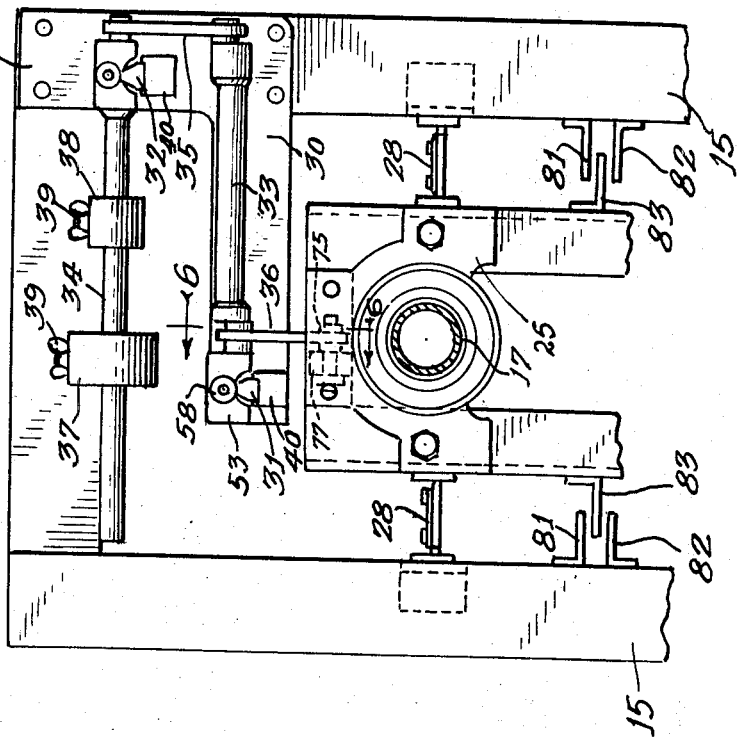
FIG. 2 is a front elevation of the upper portion of FIG. 1 showing the scale mechanism.

As shown in FIGS. 2 and 3, the scale mechanism 19 includes an L-shaped mounting plate 30 which is secured to the framework by suitable screws. The mounting plate supports fulcrum points 31 and 32 for a lower beam 33 and an upper beam 34, respectively. Beams 33 and 34 are connected at one end by a beam link 35. A load link 36 connects the lower beam 33 and the bag supporting frame 18, and is located between the fulcrum point 31 and the link 35 so as to provide a lever of the second class.

Balance weights 37 and 38 are slidably mounted on the upper beam, and may be set to a fixed position, corresponding to a fixed bag weight, by screws 39. The larger balance weight 37 is set to balance the spout supporting frame and a predetermined bag weight, such as 50 pounds or 100 pounds, and the smaller balance weight 38 provides a fine adjustment.

A suitable control device, not shown, is actuated by the tripping of the beam to operate the feed control means, such as the pinch valve 24, when the contents of the bag reaches the predetermined weight corresponding to the setting of the balance weights. This control device may be either electric, or it may be pneumatic as shown in the aforesaid patent.

With reference now to FIGS. 3 and 5, the fulcrum points 31 and 32 are of like construction and are mounted on pads 40 which project forwardly from the mounting plate 30. The pads provide a milled flat 41 for receiving the bottom surface of the fulcrum points, and they include locating ribs 42 which maintain the knife edge of each fulcrum point perpendicular to the plane of the mounting plate, so that the two knife edges will be parallel to each other. A screw 43 extending through the pad 40 draws the bottom surface of each fulcrum point into full contact with the milled flat 41 so that neither knife edge will be inclined from the horizontal.

The upper beam 34 comprises a head portion 44, a rod portion 45 extending to the left, and a saddle portion 46 to the right, as viewed in FIG. 3.

A 90° V-notch 47 is cut into the head portion 44 to provide a saddle for the fulcrum point 32. The beam is maintained in registry with he fulcrum points by retaining washers 48 and screws 49, there being sufficient clearance between the washers 48 and the end surfaces of the fulcrum point 32 as to provide free pivoting movement of the beam on the fulcrum point.

The saddle portion 46 is in the form of a cylindrical element which is secured to the end surface of the head portion 44 by a screw 50. An annular 90° V-notch 51 is cut into the surface of the cylindrical element to provide the saddle for the upper link point 67 of the link 35.

The lower beam 33 comprises a head portion 53, an adjacent saddle portion 54, a rod portion 55, and a remote saddle portion 66.

A 90° notch 57 is cut into the head portion 53 to provide the saddle for the fulcrum point 31. The beam is maintained in registry with the fulcrum point by retaining washers 58 and screws 59 in the same manner as described with respect to the upper beam 34.

The adjacent saddle portion 54 has an annular 90° sharp V-notch 60 cut into its periphery which provides the saddle for the link point 73 of the frame link 36.

The remote saddle portion 56 is a separate cylindrical element which is secured to the right end of the rod portion by a screw 61. The cylindrical element has an annular sharp 90° V-notch 62 cut in the cylindrical surface to provide the saddle for the lower link point 68 of the beam link 35.

The upper beam 34 is formed from a length of tool steel bar stock substantially 1-½ inches square. The rod portion 45 is lathe-turned down from the square stock, the lathe center preferably coinciding with the axis of the stock. The surfaces of the head portion 44 are machined, the surfaces drilled and tapped for the various screws 49 and 50, and then the beam is heat hardened.

The lower beam 33 is similarly formed from 1-½ inch square tool steel bar stock, the head portion 53 having machined surfaces and the rod portion 45 being lathe-turned down from the bar stock, with the lathe center coincident with the axis of the bar stock.

However, the adjacent saddle portion 54 is turned on a different axis, having an eccentricity of substantially three-eighths of an inch, and being located in the same vertical plane, as shown in FIGS. 11 and 12, as the axis of the portions 53 and 55. Thus the cylindrical surface is eccentric to the beam axis. The parts are so dimensioned that the saddles proper 57, 60 and 62 are all aligned with each other, and preferably located on the longitudinal beam axis. The saddle proper is the uppermost point in the apex of the V-notch 60 and the lowermost point in the apex of V-notch 62.

A similar alignment is provided for upper beam 34 in which the saddles proper 47 and 51 are aligned with the centers of gravity of the balance weights 37 and 38, and preferably all are located on the longitudinal beam axis.

The beam link 35, as shown in FIGS. 3 and 9, is an elongate element having two openings 65 at its ends, he diameter of which is greater than the diameter of the saddle portions 46 and 56. The marginal surfaces 66 surrounding the openings 65 are conical surfaces which intersect to provide an inwardly facing arcuate 60° knife edge. This arrangement provides an upper link point 67 and a lower link point 68, the link point being just that part of the arcuate knife edge which extends a few degrees on either side of the 0° or the 180° position as the case may be, as shown in FIG. 15 with respect to the link point 67.

The load link 36, as shown in FIGS. 3 and 8 also comprises an elongate element having a top opening 70 and a bottom opening 71, the top opening being larger than the bottom opening. Each of these openings have conical marginal surfaces 72 which provide a 60° inwardly facing arcuate or circular knife edge, thus providing an upper link point 73 for cooperation with the notch 60, and a lower link point 74.

The links 35 and 36 are formed of a length of tool steel bar stock. The ends are drilled and the conically counterbored to provide the arcuate knife edge, and then the link is heat hardened to about the same extent as a pipe cutting tool. Thus it is possible to provide a unitary link having universal motion at each end at a very low cost in comparison with the fabricated links of my aforesaid earlier patent.

As shown in FIGS. 6 and 7, a pad 76 is suitably secured to the rear surface of the spout mounting plate 25 by suitable means, such as screws, not shown. The pad carries a rearwardly extending mounting block 77 on which a cylindrical saddle element 75 is mounted by a bolt and nut 79. The saddle element has an annular 90° sharp V-groove 78 cut into its cylindrical surface, the lowermost point of which forms the saddle proper for the lower link point 74 of the load link 36.

The bottom opening 71 of the frame link 36 is sufficiently larger than the diameter of the saddle element 75 so that it may be easily placed over or removed therefrom. The diameter of the top opening 70 is in excess of the maximum diameter of the rod portion 55 of the lower beam plus that portion (shown in FIG. 12) of the adjacent saddle 54 which extends beyond the same. Thus the frame link can be readily fitted over the right hand end of the lower beam 33 as well as the merging portion which connects the adjacent saddle 54 with the rod portion 55, and thence it may be inserted into the notch 60.

By virtue of the above construction, the scale parts can be fabricated with much less labor than in the case of the fabricated beams and links described in my aforesaid earlier patent. Since the beams are both lathe-turned items, it is fairly easy to obtain the longitudinal alignment of the saddles proper with each other, and with the beam axis, and the problems of obtaining alignment of the two elements of a double beam is avoided.

As an alternative, the end saddle portions 46 and 56 may be eccentrically turned from the bar stock in the same manner as adjacent saddle 54.

The uprights of the framework 15, at a point opposite the spout supporting frame, are each provided with an upper stop 81 and a lower stop 82. The spout supporting frame 18 is provided with a projecting lug 83 which extends between the stops 81 and 82. Thus, when the scale mechanism has been removed, the lower stop 82 prevents deflection of the leaf springs 28, 29 to an undue extend, or beyond their elastic limit. Preferably, the stops provide movement of substantially one-eighth of an inch in either direction, that is, above or below the position shown in FIG. 1 in which the leaf springs 28, 29 are undeflected.

In operation, the scale is dismantled by first removing the load link 36 from the saddle 75. This is accomplished by lifting the spout supporting frame 18 with one hand, and swinging the lower end of the load link 36 outwardly, that is, toward the observer, as viewed in FIG. 6, until it is disengaged from the saddle element 75. The upper stops 81 prevent damage to the leaf springs 28, 29 when the spout supporting frame 18 is lifted by hand. After the frame link 36 has been removed, the spout supporting frame 18 is lowered by hand until it rests on the lower stops 82.

Then the beam link 35 is removed by manipulation of the beam 33 or 34.

Then the two beams may be lifted upwardly and removed from the fulcrum points 31 and 32. This can be done without removal of the screws 49 and retaining washers, although when the scale beams are removed for cleaning purposes, it is desirable to remove the washers eventually. Also, replacement is facilitated when the front washer is removed because the clearance is very small. In replacing, tightening up on the front screw 59 draws the beam into registry with its associated fulcrum point.

After the lower beam has been removed, it is possible to separate the frame link from the same due to the large diameter of the top opening 70, as above described.

When the parts are removed for the purpose of removing them from a corrosive atmosphere, it is also desirable to remove the fulcrum points 31 and 32, which is readily effected by removing the screws 43.

Although the principal rotation between the upper end of the load link or frame link 36 and the lower beam 33 is about the front to back axis provided by the knife edge 73, nevertheless the arcuate shape of the knife edge and of the saddle 60 permits freedom of rotation with respect to a side to side axis. Similar universal movement is provided at the lower end of the load link 36. Thus the load link 36 is a universal link because universal movement is provided at both the upper and lower ends. This universal link accommodates any misalignments between the spout supporting frame 18 and the lower beam 33, which misalignment could be in the form of an offset along the front to back axis, or an offset along the side to side axis, or a canting of the spout supporting frame 18 with respect to the plane in which the lower beam 33 rotates.

Since the vertical movement of the spout supporting frame 18 is determined by the upper and lower tension springs 28 and 29, and since these cannot be located as accurately as the various link points and saddles, it is desirable to provide a construction in which possible misalignment does not interfere with the sensitivity of the knife edge pivoting movement.

Scale mechanisms used in bag filling machines are subjected to very heavy use, there being about one cycle of operation every minute extending throughout the working day. The present invention, due to the self-aligning characteristic of the knife edge and saddle combination, reduces wear at the knife edges, and hence maintains sensitivity and accurate feed control over a long period of time, thus providing accurate bag weights.

Although only a preferred embodiment of my invention has been shown and described herein, it will be understood that various modifications and changes may be made in the construction shown.

I claim:

1. In a bag filling machine having a machine framework, a bag supporting spout, feed control means responsive to the increase in the weight of the contents of the bag supported from said spout, a frame supporting said spout, means confining said spout supporting frame to vertical movement, and scale mechanism mounted above said spout comprising a fulcrumed lower beam and a fulcrumed upper beam, said beams being vertically aligned and having vertically aligned saddle portions at the end of each, a beam link having upper and lower arcuate knife edges connecting said saddle portions, said lower beam having a second saddle portion located remotely from said end saddle portion, and a load link having an upper arcuate knife edge engaging said lower beam second saddle portion, the lower end of said load link being detachably connected to said spout supporting frame, each saddle portion having a substantially cylindrical surface and an annular V-notch formed therein for engagement by one of said arcuate knife edges.

2. A bag filling machine as claimed in claim 1 in which said spout supporting frame has a saddle portion including an annular V-notch located beneath said lower beam second saddle portions, said load link having a lower arcuate knife edge removably engaging the annular V-notch of said frame saddle portion.

3. A bag filling machine as claimed in claim 1 in which said upper beam comprises a head portion of rectangular cross section, a rod portion integrally formed therewith, a balance weight adjustably mounted on said rod portion, said end saddle portion being located adjacent said head portion, the uppermost point of the apex of its annular V-notch being aligned with the longitudinal axis of said rod portion.

4. A bag filling machine as claimed in claim 1 in which said lower beam comprises a head portion of rectangular cross section, a rod portion integrally formed therewith, said second saddle portion being located between said head portion and said rod portion with its cylindrical surface being eccentric to the longitudinal axis of said rod portion and with the uppermost point of the apex of its annular V-notch lying on said longitudinal axis, said end saddle portion being located so that the lowermost point of the apex of its V-notch lies on said longitudinal axis.

5. A bag filling machine as claimed in claim 1 in which said load link has a circular opening in its upper end, the marginal portions of said opening being conical surfaces intersecting to provide said upper arcuate knife edge, said arcuate knife edge engaging at one point the apex of the annular V-notch of said second saddle portion to provide sensitive pivoted motion about a second axis substantially parallel to the fulcrum axis of said lower beam and also permitting angular displacement of said link in a plane perpendicular to the longitudinal axis of said second saddle portion to accommodate misalignment of said spout supporting frame with said second saddle portion without interfering with said sensitive pivoted motion.

6. A bag filling machine as claimed in claim 1 in which said movement confining means comprises upper and lower leaf springs extending between said spout supporting frame and said machine framework.

7. A bag filling machine as claimed in claim 6 which includes stop means located on said machine framework and said spout supporting frame to limit the vertical movement of said spout supporting frame when said load link is disconnected therefrom.

8. A scale mechanism as claimed in claim 1 which includes a mounting plate having vertically spaced upper and lower fulcrum members projecting therefrom, said lower beam having a fulcrum saddle removably mounted on said fulcrum member, and said upper member having a fulcrum saddle removably mounted on said upper fulcrum member, said beam link being removable from said end saddles to permit removal of said upper beam and to permit removal of said lower beam when said load link is disconnected from said spout supporting frame.

9. A bag filling machine as claimed in claim 8 in which said mounting plate is provided with two pads secured to the face thereof, one for each fulcrum member, each pad having a milled flat for engaging the bottom surface of a fulcrum member and side ribs for engaging the lower side edges of a fulcrum member, and a bolt extending through said pad and drawing said fulcrum member into contact with said milled flat.

10. In a bag filling machine having a framework and a tension stabilized spout supporting frame connected thereto by leaf springs, scale mechanism including a mounting plate secured to said framework, two fulcrum points mounted on said mounting plate, an upper and a lower beam mounted on said fulcrum points with an end of each disposed one above the other, a beam link connecting said beam ends, and a load link connecting said lower beam with said spout supporting frame, said links each comprising an elongate metal piece having circular openings at either end, the inner edge of each opening being of a V-shaped cross section to provide at one portion of each opening, an arcuate knife edge, said beams having saddle portions extending through said link openings, and said saddle portions each having an annular V-notch formed therein for engagement by one of said arcuate knife edges.